Dec. 4, 1962 D. F. MERRIGAN 3,066,362
STEAM ADAPTOR STERILIZOR AND VAPOURIZING UNIT
Filed March 31, 1961
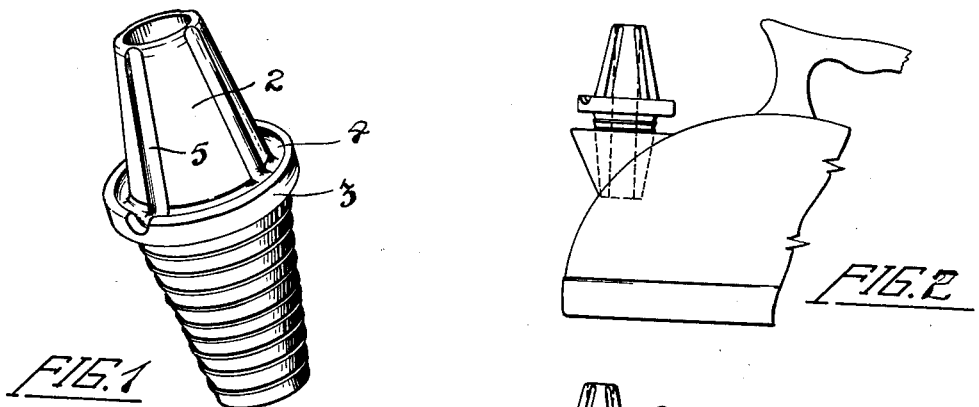
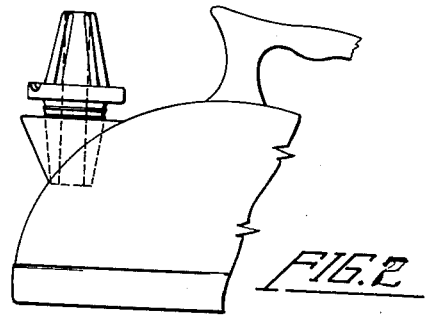
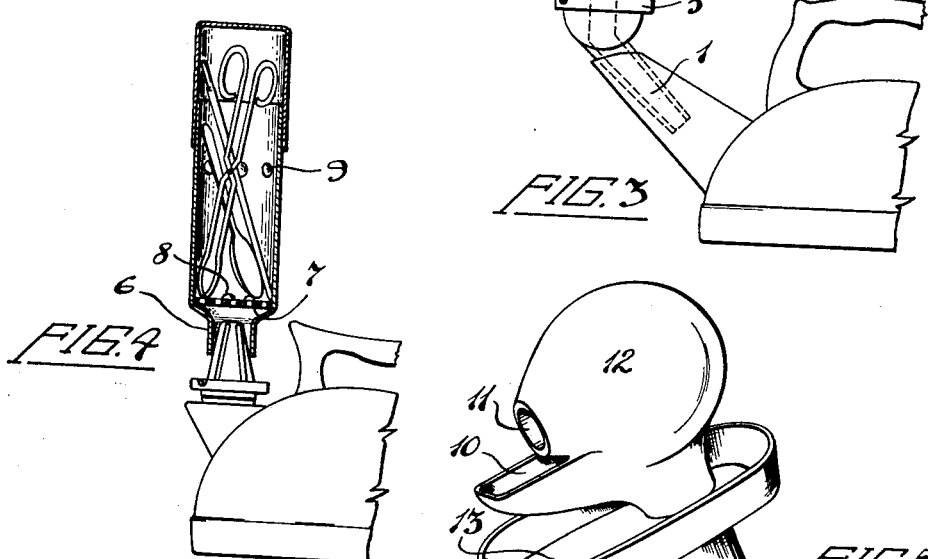
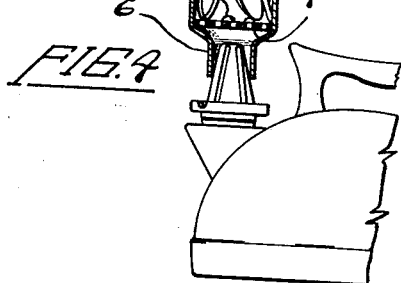
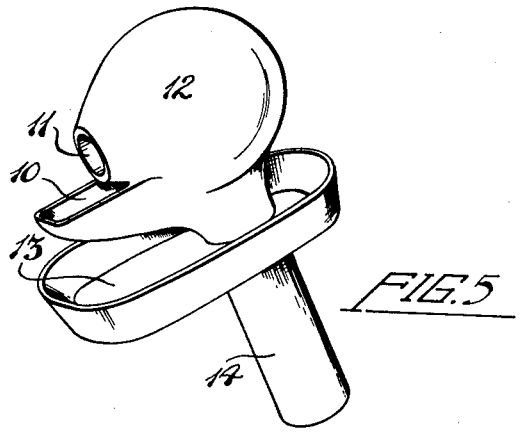
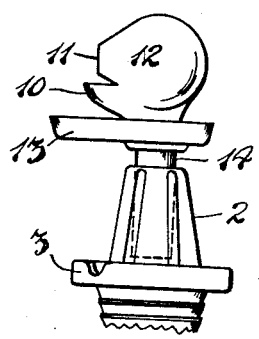
INVENTOR D. F. MERRIGAN
BY
Cecil C. Kent
HIS ATTORNEY

United States Patent Office 3,066,362
Patented Dec. 4, 1962

3,066,362
STEAM ADAPTOR STERILIZOR AND VAPOURIZING UNIT
Denis F. Merrigan, Toronto, Ontario, Canada
(31660 Pitsch Canyong Road, Malibu, Calif.)
Filed Mar. 31, 1961, Ser. No. 127,409
5 Claims. (Cl. 21—94)

The first part of my invention is an adaptor for entraining steam from a kettle into a sterilizing container or medication vapourizing unit. As employed in association with a sterilizer, the main purpose of the same is for the sterilization milk bottles and particularly babies' milk bottles and associated parts.

The second part of my invention is a telescopic sterilizer wherein articles such as babies' bottles, medical instruments and the like may be placed.

The third part of my invention is a medication vapourizing unit capable of engaging the aforesaid adaptor.

With the foregoing in view, and such other objects and advantages as will become apparent as this specification proceeds, taken in conjunction with the accompanying drawings to those skilled in the art to which my invention in its various aforesaid parts pertains, the same consists of the following construction and arrangement of parts, all as hereinafter more particularly described, reference being made to the said accompanying drawings wherein:

FIGURE 1 is a perspective view of one embodiment of my adaptor.

FIGURE 2 shows the embodiment of FIG. 1 in situ on a kettle.

FIGURE 3 shows a modification of the embodiment of FIG. 1 on a kettle.

FIGURE 4 is a sectional elevation representation of my telescopic sterilizing container in situ with respect to the adaptor of FIG. 1 and the kettle of FIG. 2.

FIGURE 5 is a perspective representation of my medication vapourizing unit.

FIGURE 6 is a side elevation of my medication and vapourizing unit in situ associated with my adaptor of FIGURE 1.

In the drawings like characters of reference designate similar parts in the several figures.

My adaptor per the accompanying FIGURES 1 and 2 is of moulded rubber to fit the pouring outlet of a great majority of electrical and non-electric kettles. In the accompanying FIGURE 3, I have illustrated my adaptor as modified for use with kettles of the most popular design in use in Great Britain from which it will be observed that the spout insert 1 is angularly related to the sterilizing union 2. Between parts 1 and 2 is an intermediate body portion 3 having a surrounding condensate trough 4. Union 2 has at least one condensate channel 5 formed therein leading to the aforesaid trough.

My sterilizing container as illustrated in FIGURE 4 is comprised of four pieces, with the body consisting of two sections forming a telescopic container that can accommodate both small and large objects. Above the container neck 6, on the inside, is fitted a small perforated plastic retaining screen or plate 7. On the upper surface of the screen are several studs 8 to maintain a nursing bottle from sealing off a large area of the retaining screen thereby restricting the steam intake. The nursing bottle sitting on the separate studs allows the steam to circulate around the bottle base. Alternatively, four ½ inch separating studs moulded as part of the inside of the container at approximately one-half inch above the retaining screen will also serve the same purpose. On the inside of the container a the funcioning position of the retaining screen are three small moulded steps for the purpose of holding the screen in position transversely of the said container.

Positioned on the inside of the sterilizing container are positioning studs at equal distances apart, their purpose being to position the nursing bottle centrally allowing the steam to circulate uniformly around the bottle. This is a particularly significant feature for use in the type of kettle where my adaptor has to be operated at an angle of 30 degrees from the perpendicular.

My vapourizing unit as depicted in the accompanying FIGURES 5 and 6, fits into the steam outlet or sterilizing union 2 of either of my forms of adaptor. Liquid or solid or other densities of medicated substance are placed in an adjacent well 10. The material of the vapouriser, being of plastic, will transmit heat to all parts, consequently any form of medication placed in the well gives off fumes.

The nozzle 11 in the head 12 of my vapourizer permits the release therethrough of a concentrated steam jet. Below well 10 is a dish-shaped apron 13 designed to cover the spout of the type of kettle illustrated in FIGURES 2 or 4 and prevent any medication from entering the kettle accidentally alternatively, the tube portion 14 may be inserted into union 2.

Since various modifications can be made in the invention hereinbefore described, and as illustrated in the accompanying drawings, what I claim as my invention is:

1. An adaptor for attachment to the spout of kettles and the like, comprising in combination a spout-insert, a sterilizer union, and an intermediate body-portion, said body-portion having a surrounding condensate trough, said union having at least one condensate channel leading to said trough.

2. In combination with the adaptor of claim 1, a telescopic container including a reduced neck engageable with said union.

3. In combination with the container according to claim 2, a perforated plate therein to sustain articles to be sterilized above the said neck.

4. The adaptor according to claim 1 in which the axis of said spout-insert is angularly related to that of said union.

5. In combination with the adaptor of claim 1, a medication vapourizing unit embodying in sub-combination a sleeve insertable into said union, a vapourizing head, an open medication well below said head, and a condensate apron below said head and well.

References Cited in the file of this patent
UNITED STATES PATENTS

| | | |
|---|---|---|
| 409,274 | Cordrey | Aug. 20, 1889 |
| 2,051,719 | Datzman | Aug. 18, 1936 |
| 2,881,755 | Diehl | Apr. 14, 1959 |
| 2,977,053 | Katzman | Mar. 28, 1961 |